June 26, 1956   E. FRISCH   2,752,546
LINEAR MOTION DEVICE
Filed April 26, 1955   2 Sheets-Sheet 1

INVENTOR
Erling Frisch.
BY
ATTORNEY

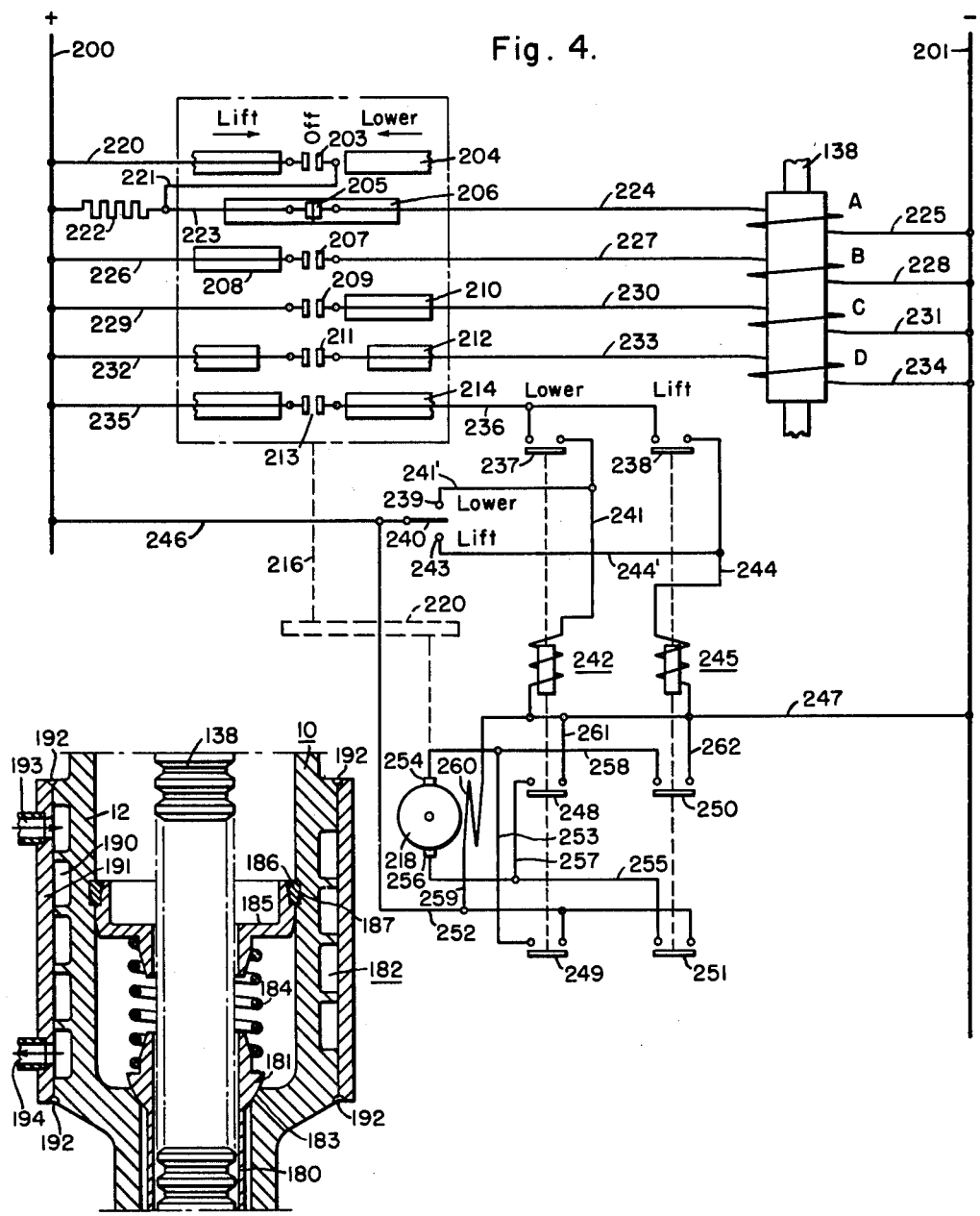

United States Patent Office 2,752,546
Patented June 26, 1956

2,752,546

LINEAR MOTION DEVICE

Erling Frisch, Pittsburgh, Pa., assignor to Westinghouse Electric Corporation, East Pittsburgh, Pa., a corporation of Pennsylvania Application April 26, 1955, Serial No. 504,075

20 Claims. (Cl. 318—135)

My invention pertains to linear motion devices and more particularly to step-by-step linear motion devices actuated by a plurality of solenoids.

My linear motion device is particularly adapted to actuate various elements in a linear direction to any desired position, such as the elements used in controlling a complex chemical process or to operate various elements of a complex machine tool. The elements to be positioned may be located within a sealed pressure vessel which requires some type of seal where the linear motion device enters the sealed pressure vessel. Previous linear motion devices have used rotary motors and converted the rotary motion to linear motion by various means, or linear motors, or a plurality of solenoids to continuously move an armature in a linear direction. The use of rotary motors and some means to convert the rotary motion to linear motion introduces additional mechanism and greatly increases the cost of the linear motion device. Linear motors and solenoid driven armatures are objectionable because the length of travel of such devices is limited either by the length of the stator field of the motor or the extent and number of solenoids used to drive the armature. In addition, solenoid driven armatures cannot be stopped in an intermediate position in their travel through the magnetic field of any one solenoid, but may only be stopped at the end of its travel through the magnetic field of a particular solenoid, thus limiting their use as a positioning device.

I have avoided these objectionable features of previous linear motion devices by using one solenoid to move an armature a predetermined amount. This armature, in turn, is coupled and uncoupled from a long continuous shaft by the movement of two additional armatures, thus moving the shaft a step at a time. By using only three solenoids and their associated armatures, I can obtain a travel limited only by the length of the shaft being moved and can stop the shaft at the end of any particular step movement. The distance the shaft is moved for each step may be made small as will be explained later, thus giving fine control of the positioned element. The solenoids of my device are energized in a predetermined sequence to continuously move the shaft a step at a time in one direction. By reversing the energizing sequence the direction of movement of the shaft can be reversed. In addition, the shaft may be locked in any position by stopping the energizing sequence and continuously energizing one particular solenoid to hold the shaft in position.

Accordingly, the principal object of my invention is to provide a linear motion device having a novel arrangement of solenoids to drive a plurality of armatures one of which will move a shaft a step at a time, while the remaining armatures actuate suitable coupling means to couple and uncouple the first armature from the shaft.

Another object of my invention is to provide a linear motion device having a novel arrangement of solenoids that are assembled into a self-contained unit which will fit over the outer surface of a tubular member and drive a plurality of armatures mounted within the tubular member.

Another object of my invention is to provide a linear motion device having a unique arrangement of solenoids that can be energized from a constant direct current power supply by means of a single controller to move a plurality of armatures in a predetermined sequence, so that one of the armatures will move a shaft a step at a time, and the remaining armatures will actuate coupling means to couple and uncouple the one armature from the shaft.

Another object of my invention is to provide a linear motion device having a unique arrangement of solenoids on the outer surface of a tubular member which may be closed at one end and attached to an opening in a sealed pressure vessel at the other end, to drive a plurality of armatures mounted within the tubular member.

Another object of my invention is to provide a linear motion device having a plurality of solenoids for driving a plurality of armatures with a novel arrangement actuated by one of said armatures for coupling and uncoupling a second armature from a shaft which is driven in a linear direction by the movement of the third armature.

Another object of my invention is to provide a linear motion device having a plurality of solenoids with novel means to energize the solenoids in a definite sequence whereby a shaft may be moved continuously in one direction a step at a time, which direction may be reversed by reversing the sequence in which the solenoids are energized.

These and other objects and advantages of my invention will be more easily understood from the following detailed description of one embodiment of my invention with reference to the attached drawings, in which:

Fig. 3 is a central longitudinal section view of the lower portion of the linear motion device shown in Fig. 1 showing the installation of a thermal barrier; and Fig. 4 is a schematic wiring diagram showing the sequence of energizing the solenoids of the embodiment of my invention shown in Fig. 1.

Figure 1:
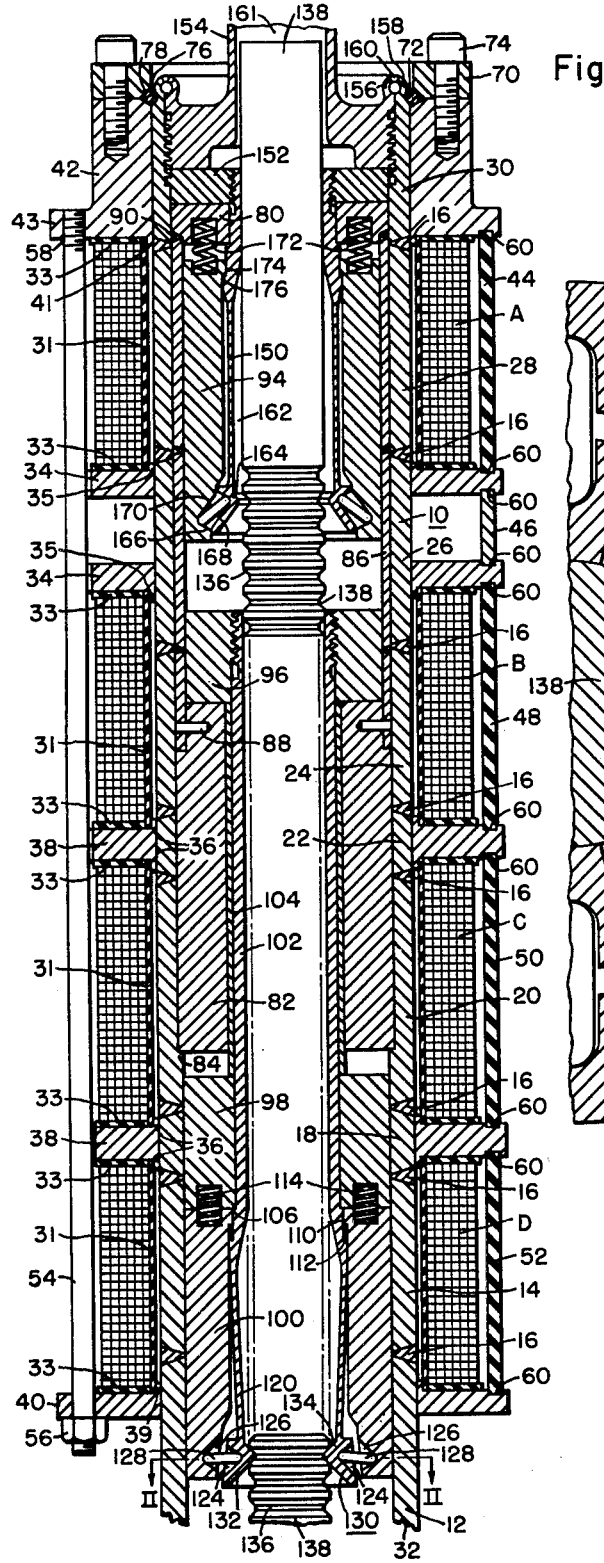
Figure 1 is a central longitudinal section view of the upper portion of a linear motion drive mechanism embodying my invention.
Figure 2:
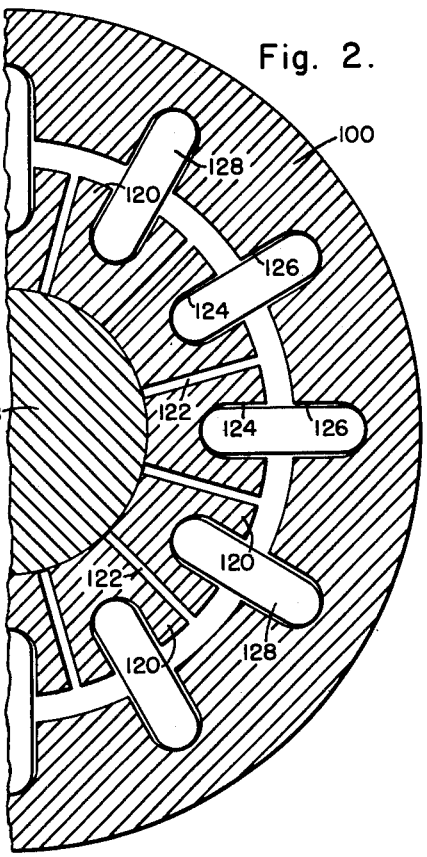
Fig. 2 is a partial horizontal section taken along the line II—II of Fig. 1 showing the coupling means for coupling one of the movable armatures to the shaft.

The embodiment of my invention shown in Figs. 1 and 2 has four solenoids mounted on the outer surface of a tubular housing 10 which are adapted to move a plurality of cylindrical armatures mounted within the tubular housing 10. Means are provided whereby the one of the armatures may be coupled and uncoupled from a shaft 138 which passes through a central opening in the armatures so that the movement of this one armature will move the shaft 138 a step at a time. The tubular housing 10 is fabricated of alternate tubular magnetic sections 12, 18, 22, 26 and 30 and nonmagnetic sections 14, 20, 24 and 28. The magnetic sections may be fabricated of any suitable magnetic material such as a magnetic stainless steel, and the nonmagnetic sections may be fabricated of any suitable nonmagnetic material such as ordinary stainless steel. I prefer to use a corrosion resistant material to form the tubular member 10 to avoid corrosion of the tubular member when my device is used in a system containing a corrosive fluid. The magnetic and nonmagnetic sections are joined together by means of a series of annular welds 16 of nonmagnetic material with the nonmagnetic sections being placed adjacent the solenoids A, B, C and D which are mounted on the outer surface of the tubular housing. The lower end 32 of the bottom magnetic section 12 may be extended to any desired length and attached to an opening in the shell of a pressure vessel by any desired means such as welding, and the fluid in the pressure vessel allowed to flood the inner volume of the tubular member 10. In some cases where the fluid in the system is at a high temperature, it may be desirable to install a thermal barrier between the pressure vessel and the lower end 32 as shown in Fig. 3, which will be described later. Thus, the tubular housing 10 may be a part of the shell of the pressure vessel and should be designed with sufficient strength to withstand the pressure of the fluid contained in the pressure vessel. The tubular member 10 also serves to isolate the solenoids which are positioned on its outer surface from the fluid contained in the sealed system.

The four solenoids A, B, C and D are mounted on the outer surface of the tubular member 10 with solenoid A at the top of the member, then beneath it is solenoid B, followed by solenoid C, with solenoid D at the bottom. Each of the solenoids consists of a coil of suitable conducting wire, such as copper, wound in a cylindrical shape. Each solenoid is insulated on its inner surface by a tubular member 31 formed from suitable insulating material, such as impregnated fiber, and at each end by a disc 33 of similar material. Two spaced washers 34 formed of magnetic material, such as magnetic steel, are placed at the bottom of solenoid A and the top of solenoid B, respectively. Each washer 34 has an axially projecting flange 35 at its central opening which serves to radially space the solenoids A and B from the outer surface of tubular member 10. Two additional washers 38 similar to washers 34 are placed between the adjacent ends of solenoids B and C and C and D, respectively. Each washer 38 has two axially and oppositely projecting flanges 36 at its central opening which serve to radially space the solenoids B, C and D from the outer surface of tubular member 10. A ring-shaped support 40 is placed at the bottom of solenoid D and it has an axial flange 39 which radially spaces the solenoid D from the outer surface of tubular member 10. A heavy ring-shaped support piece 42 having an outwardly projecting radial flange 43 at its lower end is placed on top of solenoid A. The washers 34 and 38 and support members 40 and 42 are all formed of a magnetic material, such as magnetic steel, and thus assist in concentrating the magnetic flux of each solenoid when it is energized so that it will flow through the armature associated with the solenoid, as is well known in the electrical field.

The washers and support pieces 40 and 42 are held in proper spaced relation by means of a series of tubular spacers 44, 46, 48, 50 and 52. The ends of the spacing members fit in annular grooves 69 formed in the surface of the various washers and support members 40 and 42, and are preferably fabricated in three annularly spaced segments so that suitable tie bolts 54 may pass between the edges of adjacent segments. The upper ends 58 of the tie bolts are threaded into the flange 43 and extend downward through holes in the lower support piece 40. Nuts 56 thread onto the lower end of the tie bolts 54 and are used to secure the entire assembly consisting of the solenoids A, B, C and D, the washers and spacers together to form a self-contained unit. The entire assembly of the solenoids A, B, C and D is held in place on the outer surface of the tubular housing 10 by means of a clamp ring 70 at the top of the tubular housing 10 which secures a split ring 72 of resilient metallic material in position. The clamp ring 70 is attached to the upper surface of the support piece 42 by means of cap screws 74. The split ring 72 fits in a radial groove 76 formed on the outer surface of the tubular housing 10 and a groove 78 having a V-shaped cross section which is formed by beveling the inner edges of the clamp ring 70 and the support piece 42 as shown in Fig. 1.

By means of the above described construction, I have provided an assembly of four solenoids A, B, C and D which are properly spaced by suitable spacing members and are assembled together in one complete unit. This unit may easily be installed or removed from the outer surface of the tubular housing 10 by means of the clamp ring 70 and the split ring 72. Thus, the unit may be removed from the outer surface of the tubular housing 10 and be replaced by another unit in order that a faulty solenoid in the removed unit may be replaced and the operation of the linear motion device will only be interrupted for the short interval required to remove and replace the unit.

Positioned within the tubular housing 10 are a plurality of armatures, of which 80 and 82 are fixed and the remaining of which, 94, 96, 98 and 100, are movable armatures. All of the armatures have a general cylindrical shape with a large central opening through which the shaft 138 may pass and are constructed of suitable magnetic material, such as magnetic stainless steel. The lower surface of the armature 82 rests on an inwardly projecting shoulder 84 formed on the inner surface of nonmagnetic section 20 near the center of tubular housing 10. Attached to the upper end of the armature 82 by means of the pins 88 is a composite spacer bushing 86. The spacer bushing 86 is fabricated from alternate magnetic and nonmagnetic sections so that when it is positioned in the tubular housing 10, its sections will align with the magnetic and nonmagnetic sections of the tubular housing 10. The upper end of the spacer bushing 86 is attached to the fixed armature 80 by means of an annular weld 90. The fixed assembly of armature 80, spacing tube 86 and armature 82 is held in position against shoulder 84 by means of an annular spacer 152 and the housing closure 154, to be described later. Positioned below the fixed armature 80 are movable armatures 94 and 96 which are adapted to slide axially along the inner surface of the spacer bushing 86. Positioned below the fixed armature 82 are movable armatures 98 and 100 which, in turn, are adapted to move axially along the inner surface of the tubular housing 10.

The armature 98 is positioned on the outer surface of a lower coupling tube 102 and is held in a spaced axial position from armature 96 by means of a spacing tube 104. The lower surface of armature 98 rests on a shoulder 106 formed on coupling tube 102 and the complete assembly of armature 96, spacing tube 104 and armature 98 is held in position by means of the armature 96 which threads onto the upper end of the coupling tube 102 and forces the lower end of armature 98 against shoulder 106. The movable armature 100 is also positioned on the lower end of the coupling tube 102 beneath armature 98, and it has a restricted movement which is limited by means of the inwardly projecting flange 110 which is formed on the inner surface of the armature 100 and the radial shoulder 112 which projects radially outward from the outer surface of the coupling tube 102. A plurality of coil compression springs 114 are provided so that the movable armature 100 is normally held in its lowest position with the flange 110 in contact with the shoulder 112.

A plurality of circumferentially spaced locking fingers 120 are formed on the lower end of the coupling tube 102 by means of a plurality of milled longitudinal slots 122 as shown in Fig. 2. Additional radial slots 124 having a V-shaped cross section are cut in the outer surface of the enlarged fingertip portion 130 of each of the locking fingers 120. Radial slots 126 also having a V-shaped cross section are cut in the inner surface of the lower end of the armature 100 radially opposite each of the radial slots 124, respectively. Small pivoting pins 128 having rounded ends are inserted in each of the slots 124 and 126 and serve to force each of the fingertips 130 of the locking fingers 120 into one of the circumferential grooves 136 formed on the shaft 138, when the armature 100 is lifted by the magnetic action of the solenoid D. Each fingertip 130 is formed on the lower end of the locking fingers 120 by means of the converging inner surfaces 132 and 134. The fingertip 130 is adapted to engage any one of a plurality of circumferential grooves 136 on the shaft 138, each of which has a substantially V-shaped cross section, as shown in Fig. 1.

Thus, by means of the above described construction, the fingertips 130 will be moved radially in by the pivot action of pins 128 and grip the shaft 138 when the armature 100 is moved upward by the magnetic action of the solenoid D, thus coupling the shaft 138 to armature 98. When the solenoid D is deenergized and no magnetic action is present, the armature 100 will be forced to its lowest position by means of the springs 114, and the fingertips 130 will be disengaged from the radial grooves 136. I have thus provided means whereby one of the movable armatures 98 positioned on the inner surface of the tubular housing 10 may be coupled and uncoupled from the shaft 138 in order that the movable armature 98 may move the shaft 138 a step at a time when its solenoid is energized, as will be described later.

Threaded into a central opening in the spacer 152 which positioned on top of the fixed armature 80 is an upper coupling tube 150. The annular spacer 152 is held in position by means of the housing end closure 154 which threads into the tubular housing 10 and serves to lock the fixed armature 80 in a spaced axial position from the fixed armature 82, which in turn rests against the inwardly projecting shoulder 84. The threaded joint between the tubular housing 10 and the end closure 154 may be sealed by means of two converging flanges 156 and 158 formed on the end closure 154 and the tubular housing 10, respectively, which are joined by means of an annular weld 160. The central opening 161 in the end closure 154 through which the shaft 138 passes may be closed at its uper end by any suitable means (not shown). Of course, the central tubular portion of end closure 154 must extend upward a sufficient distance to allow for the desired upward travel of the shaft 138.

Formed on the lower end of the upper coupling tube 150 are a plurality of locking fingers 162 which are identical with the locking fingers 120, previously described. Formed on the lower end of each of the locking fingers 162 are suitable fingertips 164 which are identical with the fingertips 130. A pivoting pin 170 identical with the pivot pins 128 fits in radial grooves 168 and 166 which are formed in the outer surface of each of the fingertips 164 and the inner surface of the armature 94, respectively. The pivot pins 170 serve to force the fingertips 164 into a groove 136 formed on the shaft 138 when the armature 94 is moved upward by means of the magnetic action of the solenoid A. The armature 94 is normally held in its lowest position by means of a plurality of circumferentially spaced compression springs 172. The downward travel of the armature 94 is limited by means of the inwardly projecting radial flange 174 formed on the inner surface of the armature 94 and the shoulder 176 projecting outwardly from the outer surface of the upper coupling tube 150. When solenoid A is energized and the fingertips 164 moved radially inward, they will lock the shaft 138 in the position to which it has been moved by armature 98.

As shown in Fig. 1, the solenoid D is energized and the fingertips 130 are forced into grooves 136 on the shaft 138. As a result, the shaft is coupled to the coupling tube 102 which is rigidly attached to the armatures 96 and 98. As the next step of the sequence, solenoid C is energized in addition to solenoid D, which in turn will move armature 98 upward against the lower surface of the fixed armature 82. Since solenoid D remains energized, the coupling tube 102 remains coupled to the shaft 138 which consequently is moved the same distance as armature 98. Solenoid A is now energized in addition to solenoids C and D. As a result, the moving armature 94 is forced upward against the fixed armature 80, causing the coupling fingers 164 to engage a groove 136 on a shaft 138. Thus, the upper coupling tube 150 is locked to the shaft 138 and any movement of the shaft 138 is prevented as long as the solenoid A remains energized, even though solenoids C and D may be subsequently deenergized. To continue the upward movement of the shaft 138 the solenoids C and D are deenergized and solenoid B is energized, which forces the armature 96 downward against the upper surface of the fixed armature 82. When armature 96 is moved downward it will return the coupling tube 102 and armatures 98 and 100 to their original position. At this point solenoid D may be energized again, forcing the movable armature 100 upward and engaging the fingers 130 with the next lower groove 136 on the shaft 138, and solenoids A and B are deenergized, and thus the linear motion device corresponds to the condition at the start of the described cycle. If it is desired to lower the shaft 138 instead of lifting it as described above, one only has to reverse the sequence of the cycle described above for lifting the shaft. The distance that the shaft 138 is moved for each complete cycle can be changed by changing the spacing of the grooves 136 on the shaft 138 and the distance that armature 98 moves to correspond to the spacing of the grooves 136.

The thermal barrier shown in Fig. 3 is installed on the lower portion 12 of tubular member 10 and consists of a thermal sleeve 180 which surrounds the shaft 138 and limits the flow of fluid from the system into the linear motion device. A cooling coil 182 which surrounds the lower end of tubular member 10 is provided so that any fluid leaking past the thermal sleeve 180 will be cooled before it flows into the remainder of the linear motion device. The thermal sleeve 180 has a spherical surface 181 formed on an upper enlarged upper portion thereof which is held in contact with a similarly shaped surface 183 formed on the inner surface of a necked-in portion of the lower magnetic section 12 by means of a coil compression spring 184. The spring 184 reacts against a shoulder on the enlarged portion of the thermal sleeve 180 at its lower end, and against a spring washer 185 at its upper end. The spring washer 185 is held in position by having a shoulder thereon engage a snap ring 186 which fits in an annular groove 187 formed on the inner surface of the lower magnetic section 12.

The seal between the two spherical surfaces 181 and 173 prevents the flow of the fluid from the system into the linear positioning device through the joint between the thermal sleeve 180 and the lower magnetic section 12. Thus, all flow between the system and the positioning device is limited to that which occurs between the shaft 138 and the inner diameter of the thermal sleeve 180. This amount is limited by maintaining a small clearance between the inner diameter of the thermal sleeve 180 and the shaft 138. Of course, any flow between the system and the positioning device must take place by diffusion of the hotter fluid in the system to the cooler fluid in the positioning device, since the positioning device is completely sealed and there is no return path to the system for the fluid in the positioning device.

In order to cool the small amount of fluid flowing by diffusion into the positioning device, I have provided cooling coil 182 which surrounds the lower end of the lower magnetic section 12. The cooling coil 182 consists of a spiral groove 190 generated on the outer surface of the lower magnetic section 12 which is closed on the outer surface by a tubular member 191 which is sealed at each end to the lower magnetic section 12 by small annular welds 192. The combination of the spiral groove 190 and tubular member 191 thus forms a closed spiral channel which is coiled around the outer surface of the lower magnetic section 12. An inlet conduit 193 is provided at the top or beginning of the closed channel, and an outlet conduit 194 is provided at the bottom of the channel.

Fig. 4 shows a schematic arrangement for energizing the solenoids A, B, C and D from a direct current power supply in the proper sequence so that the shaft 138 is either lifted or lowered a step at a time as described above. The various elements of the circuit are connected to a direct current power supply which is supplied by power leads 200 and 201. A series of cams 204, 206, 208, 210, 212 and 214 are all mounted on a common shaft 216 and serve to open close switches 203, 205, 207, 209, 211 and 213, respectively. A direct current shunt field motor 218 is geared to the shaft 216 by means of gearing 220 to slowly rotate shaft 216 in either direction. One side of the switch 203 is connected to the positive power lead 200 by a lead 220, and the other side is connected to one side of switch 205 by lead 221 and lead 223. A resistance 222 is connected to the power lead 200 at one end and the other end is connected to one side of switch 205 by the lead 223. Thus, when the switch 203 is closed the resistor 222 will be bypassed and the side of switch 205 connected to the resistance 222 will be connected directly to power lead 200, and when the switch 203 is opened resistance 222 will be in series with switch 205. The other side of switch 205 is connected to one side of solenoid A by a lead 224 and the other side of solenoid A is connected to the negative power lead 201 by a lead 225. One side of switch 207 is connected to the power lead 200 by means of a lead 226, and the other side of switch 207 is connected to one side of solenoid B by means of a lead 227. The other side of solenoid B is connected to the power lead 201 by means of a lead 228. One side of the switch 209 is connected to the power lead 200 by means of a lead 229, and the other side is connected to the solenoid C by means of a lead 230. The other side of solenoid C is connected to the power lead 201 by means of a lead 231. One side of switch 211 is connected to the power lead 200 by means of a lead 232, and the other side is connected to the solenoid D by means of a lead 233 which, in turn, is connected to the power lead 201 by means of a lead 234. Thus, there is provided a separate switch in series with each solenoid A, B, C and D so that each solenoid may be energized from the power supply as required to move the shaft 138 a step at a time.

One side of switch 213 is connected to the power lead 200 by means of a lead 235, and the other side is connected to one of the stationary contacts of each set of relay contacts 237 and 238, of relays 242 and 245, respectively, by means of a lead 236. The other stationary contact of relay contacts 237 is connected to one end of the solenoid of relay 242 by a lead 241 and to one stationary terminal 239 of a double-throw single-pole switch 240 by means of a lead 241'. The other stationary contact of relay contacts 238 is connected to one end of the solenoid of relay 245 by a lead 244 and to the other stationary terminal 243 of switch 240 by means of a lead 244'. The other ends of the solenoids of relays 242 and 245 are connected to the negative power lead 201 by means of a lead 247. The movable contact of the set of relay contacts 248 is also operated by the relay 242, and one stationary contact is connected to one brush 256 of the motor 218 by means of conductors 255 and 257, and the other stationary contact is connected to the negative power lead 201 by a lead 261 connected to lead 247. A third set of contacts 249 of relay 242 has one stationary contact connected to the other motor brush 254 by means of leads 253 and 258, and the other stationary contact is connected to the positive lead 200 by means of leads 252 and 246. The movable contact of another set of relay contacts 250 is operated by the relay 245, and one stationary contact thereof is connected to the brush 254 by the lead 258, and the other stationary contact thereof is connected to the negative power lead 201 by leads 262 and 247. A third set of contacts 251 of relay 245 has one stationary contact connected to the brush 256 by a lead 255, and the other stationary contact thereof is connected to the positive power lead 200 by leads 252 and 246. The field 260 of the motor 218 is connected directly across the power leads 200 and 201 by means of leads 259 and 252, and 247, respectively.

The relays 242 and 245 and their associated circuits provide a means whereby the polarity of the leads to the motor brushes 254 and 256 may be reversed, thus reversing the direction of rotation of motor 218. For example, if switch 240 is closed in the "Lower" position, relay 242 will be energized, thus closing its contacts 237, 248 and 249. This will connect brush 254 to the positive power lead 200 by means of leads 258 and 253, closed contacts 249 and leads 252 and 246. Brush 256 will then be connected to the negative power lead 201 by means of leads 255 and 257, closed contacts 248 and leads 261 and 247. By reversing switch 240 and closing it in the "Lift" position, the polarity of the connections to motor brushes 254 and 256 will be reversed. Closing switch 240 in the "Lift" position will deenergize relay 242 and energize relay 245, thus closing contacts 238, 250 and 251. This will connect brush 254 to the negative power lead 201 through closed contacts 250, and brush 256 to the positive power lead 200 through closed contacts 251. This will reverse the polarity of the leads to brushes 254 and 256 which, in turn, will reverse the direction of rotation of the motor 218 and the shaft 216.

By proper arrangement of cams 204, 206, 208, 210, 212 and 214 it is apparent that solenoids A, B, C and D can be connected to the power leads 200 and 201 as required, to move the shaft 238 a step at a time. In order that the shaft 238 may be moved in opposite directions, I have provided the double-throw switch 240 which can be operated to energize either one of the two relays 242 or 245 which, in turn, will change the polarity of the brushes 254 and 256 of motor 218, so that the motor rotates in the proper direction to operate the switches associated with the solenoids A, B, C, and D. The position of the switches shown in Fig. 4 is the normal position for the linear motion device shown in Fig. 1. In this position solenoid A is energized to lock the shaft 138 in position, and the resistance 214 is in series with the solenoid A to limit the current flowing in solenoid A. Also, the remaining switches 203, 207, 209, 211 and 213 are open. The shaft may be moved in either direction by closing switch 240, for example, if the switch 240 was closed in the "Lower" position, the relay 242 would be energized and the relay contacts 237, 248 and 249 would be closed. When the relay contacts 248 and 249 close, the motor is energized to rotate the cam shaft 216 in the direction designated "Lower." As the shaft 216 starts to rotate, switches 203, 209 and 213 will close. The closing of switch 203 short circuits the resistance 222, as previously described, thus energizing the solenoid A with full line voltage. The closing of switch 209 energizes solenoid C, thus moving the armature 98 upward against the lower surface of armature 82 (Fig. 1). Closing switch 213 establishes a parallel circuit with that of the switch 240 and insures the continued rotation of the cam shaft 216 by motor 218 until the lowering sequence is completed for lowering shaft 138 one step even though switch 240 may be returned to its neutral position. As the shaft 216 continues to rotate, the switch 211 will be closed next, thus energizing solenoid D. When the solenoid D is energized, the armature 100 will move upward, thus engaging the lower coupling means with the shaft 138. Next, the switch 205 will be opened, thus deenergizing the solenoid A and disengaging the upper locking means from the shaft 233. Then, the switch 209 will be opened, deenergizing the solenoid C, after which the switch 207 will be closed, energizing solenoid B. This will cause the armature 96 to move downward until it contacts the upper surface of the fixed armature 82, which will move the shaft 138 a like distance since armature 96 is coupled to the shaft 138. Then, the switch 205 will close, energizing the solenoid A which will engage the upper locking means with the shaft 138, locking the shaft 138 in the position to which it was moved by armature 96. The lowering cycle is next completed by the opening of switch 211 which will deenergize the solenoid D to disengage the lowering coupling means from the shaft 138. The shaft 216 will thereafter cease to rotate if the switch 240 has been returned to the neutral position when the switch 213 opens, since this will deenergize the relay 242 and open its associated relay contacts, thus stopping the motor 218. As the switch 213 opens, switch 203 will also open, thus reinserting the resistance 222 in series with the solenoid A. The resistance 222 will reduce the amount of current flowing in the solenoid A, which is possible since considerably less force is required to hold the upper coupling means in engagement with the shaft 138 after it has been engaged than is required to originally engage the coupling means. In case the switch 240 is maintained in the "Lower" position, the cam shaft 216 will continue to rotate since the relay 242 will remain energized, thus keeping its contacts 237, 248 and 249 closed.

In order to raise the shaft 138, switch 240 would be closed in the "Lift" position which would energize the motor 218 so that it would rotate in the opposite direction from that described above for the lowering operation. As shaft 216 rotates in the opposite direction, switches 203, 205, 207, 209, 211 and 213 would open and close in the reverse sequence to that described above for lowering the shaft 138.

This invention thus provides a linear motor consisting of a plurality of longitudinally spaced solenoids A, B, C and D which move a plurality of armatures 94, 96, 98 and 100. The movement of armature 100 will rigidly couple the shaft 138 to armatures 96 and 98 so that when armatures 96 and 98 move, shaft 138 will be moved a corresponding distance. The movement of armature 94 will lock the shaft 138 in the position to which it has been moved by armatures 96 and 98 and allow these armatures to be uncoupled from shaft 138 and returned to their original position. The armatures 96 and 98 can again be coupled to shaft 138 by the movement of armature 100 so that the shaft 138 can be unlocked from the locking means and armatures 96 and 98 again move a predetermined amount to move the shaft 138 an equal distance. The movement of shaft 138 can be continued in this step by step fashion throughout the length of shaft 138 and in either direction. It is also possible to stop the shaft 138 at the end of any cycle and maintain the shaft 138 locked in this position. The invention also provides a series of cam operated switches so that solenoids A, B, C and D are energized in the proper sequence to move the shaft 138 a step at a time in either direction. The cam operated switches also operate to insert a resistance in series with the solenoid A which engages the locking means at the end of each cycle and to establish a parallel circuit with the circuit of manual switch 240 used to start the motor 218 until the cycle is completed.

Since numerous changes may be made in the above described construction, and different embodiments of my invention may be made without departing from the spirit and scope thereof, it is intended that all matter contained in the foregoing description or shown in the accompanying drawings shall be interpreted as illustrative, and not in a limiting sense.

I claim as my invention:

1. A rectilinear motor comprising, a plurality of spaced aligned solenoids, a shaft member projecting through said solenoids, coupling means having an armature located to be actuated by energizing one of said solenoids for coupling said shaft to the movable armature of a second one of said solenoids so that the second solenoid when energized will move its movable armature and shaft a predetermind distance, and a locking means having an armature located to be actuated by energizing a third one of said solenoids for holding said shaft at the position to which it is moved by said second solenoid so that said coupling means may be disengaged from said shaft and returned to its original position, whereupon the shaft may be again moved in the same direction an additional predetermined amount in a step-by-step fashion.

2. A rectilinear motor comprising, a solenoid, a shaft member projecting through said solenoid, a coupling means for coupling said shaft to the movable armature of said solenoid so that said solenoid when energized will move said movable armature and shaft a predetermined distance, and a releasable locking means for holding said shaft at the position to which it is moved by said solenoid so that said coupling means may be disengaged from said shaft and returned to its original position, whereupon the shaft may be again moved in the same direction an additional predetermined amount in a step-by-step fashion.

3. A rectilinear motor comprising, a solenoid mounted on the outer surface of a tubular member, a shaft member projecting through said tubular member, said shaft having a plurality of equally spaced annular grooves formed on its outer surface, coupling means including an element mounted for movement into and out of engagement with one of said annular grooves for coupling said shaft to the movable armature of said solenoid so that said solenoid when energized will move said movable armature and shaft a predetermined distance, and locking means including an element mounted for movement into and out of engagement with another of said annular grooves for holding said shaft at the position to which it is moved by said solenoid so that said coupling means may be disengaged from said shaft and returned to its original position whereupon the shaft may be again moved in the same direction an additional predetermined amount in a step-by-step fashion.

4. A rectilinear motor comprising, a plurality of spaced aligned solenoids, a shaft member projecting through said solenoids, first coupling means for coupling said shaft to the movable armature of one of said solenoids comprising, a tubular member about said shaft having a plurality of longitudinally extending radially movable individual finger members on one end thereof, said finger members being movable into and out of engagement with one of a plurality of annular grooves formed on said shaft but normally biased out of engagement therewith, means including the movable armature of a second one of said solenoids for moving said finger members radially inward to engage an annular groove, means including said one solenoid for moving its movable armature and shaft when coupled thereto a predetermined distance, a locking means for holding said shaft at the position to which it is moved by said one solenoid so that said coupling means may be disengaged from said shaft and returned to its original position, whereupon the shaft may be again moved in the same direction an additional predetermined amount in a step-by-step fashion.

5. A motive device comprising, a plurality of spaced aligned solenoids, a separate movable armature associated with each of said solenoids, a shaft passing through aligned central openings in said armatures, coupling means actuated by one of said armatures when its solenoid is energized for coupling said shaft to a second one of said armatures so that the second solenoid when energized will move said second armature and shaft a predetermined distance, and means actuated by the movement of a third of said armatures for holding said shaft at the position to which it is moved by said second armature so that said coupling means may be disengaged and returned to its original position.

6. A motive device comprising, a plurality of spaced solenoids, a separate movable armature associated with each of said solenoids, a shaft passing through aligned central openings in said armatures, coupling means responsive to the movement of one of said armatures when its solenoid is energized for coupling said shaft to a second of said armatures so that the second solenoid when energized will move said second armature and shaft a predetermined distance, and means responsive to the movement of a third of said armatures for holding said shaft in the position to which it is moved by said second armature so that said coupling means may be disengaged and return to its original position.

7. A rectilinear motor comprising, four aligned spaced solenoids, a shaft mounted in said solenoids for rectilinear movement in either direction, a movable armature associated with each of said solenoids, coupling means responsive to the movement of one of said armatures when energized by its solenoid for coupling said shaft to a second of said armatures so that said second armature when moved a predetermined distance by energization of its solenoid will move said shaft an equal distance, a holding means responsive to the movement of a third one of said armatures upon energization of its solenoid for holding said shaft in the position to which it is moved by said second armature, the fourth one of said armatures when energized by its solenoid returning said coupling means, said one armature and said second armature to their original position.

8. A rectilinear motor comprising, four aligned spaced solenoids, a shaft mounted in said solenoids for rectilinear movement in either direction, a movable armature associated with each of said solenoids, coupling means responsive to the movement of one of said armatures when energized by its solenoid for coupling said shaft to a second of said armatures so that said second armature when moved a predetermined distance by energizing its solenoid will move said shaft an equal distance, a holding means responsive to the movement of a third one of said armatures when energized by its solenoid for holding said shaft in the position to which it is moved by said second armature, the fourth one of said armatures when energized by its solenoid returning said first and second armatures to their original positions, a plurality of switches in circuit with said solenoids, respectively, means including a rotating member for opening and closing said switches in a repeating predetermined sequence when operated in one direction to first close the switch in circuit with the solenoid of said first armature, then to close the switch in circuit with the solenoid of said second armature, then to close the switch in circuit with the solenoid of said third armature, then open the switches in circuit with the solenoids of said first and second armature and then completing said sequence by closing the switch in circuit with the solenoid of said fourth armature.

9. A rectilinear motor comprising, four aligned spaced solenoids, a shaft mounted in said solenoids for rectilinear movement in either direction, a movable armature associated with each of said solenoids, coupling means responsive to the movement of one of said armatures when energized by its solenoid for coupling said shaft to a second of said armatures so that said second armature when moved a predetermined distance by energizing by its solenoid will move said shaft an equal distance, a holding means responsive to the movement of a third one of said armatures when energized by its solenoid for holding said shaft in the position to which it is moved by said second armature, said fourth one of said armatures when energized by its solenoid returning said first and second armature to their original position, a switch in circuit with each of said solenoids respectively, means including a member rotated by an electric motor for opening and closing said switches in a repeating predetermined sequence when operated in one direction to first close the switch in circuit with the solenoid of said first armature then to close the switch in circuit with the solenoid of said second armature then to close the switch in circuit with the solenoid of said third armature, then to open the switches in circuit with the solenoids of said first and second armatures and then to complete said sequence by closing the switch in circuit with the solenoid of said fourth armature, an additional switch in circuit with said electric motor, said additional switch being closed by said rotating member at the start of said sequence and being opened by said rotating member at the end of said complete sequence.

10. A rectilinear motor comprising, a plurality of spaced aligned solenoids mounted on the outer surface of a composite tubular member formed of alternate tubular sections of magnetic material hermetically joined to sections of non-magnetic material, said solenoids mounted opposite said non-magnetic sections, a shaft member projecting through said tubular member, a coupling means actuated by the armature of one of said solenoids for coupling said shaft to the movable armature of a second one of said solenoids so that the solenoid when energized will move said movable armature and shaft a predetermined distance, and a locking means for holding said shaft at the position to which it is moved by said second solenoid so that said coupling means may be disengaged from said shaft and returned to its original position, whereupon the shaft may be again moved in the same direction an additional predetermined amount in a step-by-step fashion.

11. A rectilinear motor comprising, a plurality of aligned solenoids longitudinally spaced along the outer surface of a tubular member, a shaft member projecting through said tubular member, said shaft having a plurality of equally spaced annular grooves formed on its outer surface, coupling means actuated by the armature of one of said solenoids including an element mounted for movement into and out of engagement with one of said annular grooves for coupling said shaft to the movable armature of a second one of said solenoids so that said second solenoid when energized will move said movable armature and shaft a predetermined distance, means including a fixed armature associated with said second solenoid to limit the travel of said movable armature of said second solenoid to the spacing between two adjacent grooves on said shaft, and locking means including an element mounted for movement into and out of engagement with another of said annular grooves for holding said shaft at the position to which it is moved by said second solenoid so that said coupling means may be disengaged from said shaft and returned to its original position whereupon the shaft may be again moved in the same direction an additional predetermined amount in a step-by-step fashion.

12. A rectilinear motor comprising, a plurality of spaced aligned solenoids mounted on the outer surface of a tubular member, said solenoids being spaced by means of a plurality of segmented cylindrical spacers inserted between the opposed ends of adjacent solenoids, end plates at the outer ends of the end solenoids, means including said end plates for holding said spaced solenoids and spacers together as a rigid unit, removable means for mouting said unit in an axially aligned position on the outer surface of said tubular member, a shaft member projecting through said tubular member, a coupling means actuated by the armature of one of said solenoids for coupling said shaft to the movable armature of a second one of said solenoids so that the solenoid when energized will move said movable armature and shaft a predetermined distance, and a locking means for holding said shaft at the position to which it is moved by said second solenoid so that said coupling means may be disengaged from said shaft and returned to its original position, whereupon the shaft may be again moved in the same direction an additional predetermined amount in a step-by-step fashion.

13. A rectilinear motor comprising, four aligned spaced solenoids, a shaft mounted in said solenoids for rectilinear movement in either direction, a movable armature associated with each of said solenoids, coupling means responsive to the movement of one of said armatures when energized by its solenoid for coupling said shaft to a second of said armatures so that said second armature when moved a predetermined distance by energizing its solenoid will move said shaft a predetermined distance, a holding means responsive to the movement of a third one of said armatures when energized by its solenoid for holding said shaft in the position to which it is moved by said second armature, a resistance in series with said third solenoid, said fourth one of said armatures when energized by its solenoid returning said coupling means, said one armature and said second armature to their original position, a switch in circuit with each of said solenoids, an additional switch in circuit with said third solenoid for short circuiting said resistance, means including a member rotated by an electric motor for opening and closing said switches in a repeating predetermined sequence when operated in one direction to first close the switch in circuit with the solenoid of said first armature and the additional switch to short circuit said resistance, then to close the switch in circuit with the solenoid of said second armature, then to close the switch in circuit with the solenoid of said third armature, then to open the switches in circuit with the solenoids of said first and second armature, then to complete said sequence by closing the switch in circuit with the solenoid of said fourth armature and opening the additional switch in circuit with the solenoid of said third armature to insert said resistance in series with the circuit of said solenoid.

14. A rectilinear motor comprising, a solenoid mounted on the outer surface of a tubular member, said tubular member being closed at one end and adapted to be in fluid communication with an external source of fluid at the opposite end, a shaft member projecting into said tubular member, a coupling means for coupling said shaft to the movable armature of said solenoid so that said solenoid when energized will move said movable armature and shaft a predetermined distance, a releasable locking means for holding said shaft at the position to which it is moved by said solenoid so that said coupling means may be disengaged from said shaft and returned to its original position, whereupon the shaft may be again moved in the same direction an additional predetermined amount and a thermal barrier surrounding a portion of said tubular member adjacent said opposite end comprising a cooling coil on the outer surface of said tubular member and a thermal sleeve surrounding said shaft and sealed on its outer surface to the inner surface of said tubular member.

15. A rectilinear motor comprising a plurality of solenoids, longitudinally spaced along the outer surface of a tubular member, a shaft member projecting through said tubulaar member, said shaft having a plurality of equally spaced annular grooves formed on its outer surface, coupling means including a first coupling tube rigidly attached at one end to a first movable armature of one of said solenoids and having a plurality of radially movable elements at the opposite end, a second movable armature of a second one of said solenoids mounted on said coupling tube at a fixed axial distance from said first armature, a third movable armature of a third one of said solenoids mounted on said coupling tube and having a limited axial movement along the outer surface of said coupling tube, the axial movement of said third movable armature moving said radially movable elements into and out of engagement with one of said annular grooves on said shaft, a fourth armature associated with both said first and second solenoids rigidly mounted on said tubular member between said first and second movable armatures, a fifth armature of a fourth one of said solenoids rigidly mounted on said tubular member at a fixed axial position spaced from said fourth armature, a second coupling tube rigidly mounted in said tubular member and having a plurality of radially movable elements, a sixth armature mounted on said second coupling tube and having a limited axial movement which moves the radially movable elements of said second coupling tube into and out of engagement with the annular grooves on said shaft, so that said first coupling means may couple said shaft to the said first and second movable armatures while said second movable armature moves the shaft a predetermined distance and said first movable armature may return said first coupling means to its original position while said second coupling means holds said shaft in the position to which it was moved.

16. A rectilinear motor comprising, a plurality of spaced aligned solenoids, a shaft member projecting through said solenoids, coupling means having an armature located to be actuated by energizing one of said solenoids for coupling said shaft to the movable armature of a second one of said solenoids so that the second solenoid when energized will move its movable armature and the shaft a predetermined distance, a locking means having an armature located to be actuated by energizing a third one of said solenoids for holding said shaft at the position to which it is moved by said second solenoid so that said coupling means may be disengaged from said shaft and returned to its original position, whereupon the shaft may be again moved in the same direction an additional predetermined amount in a step-by-step fashion, and means for inserting a resistance in series with said third solenoid when said third solenoid is energized to engage said holding means and said rectilinear motor is stopped.

17. A rectilinear motor comprising, a plurality of spaced aligned solenoids, a shaft member projecting through said solenoids, coupling means having an armature located to be actuated by energizing one of said solenoids for coupling said shaft to the movable armature of a second one of said solenoids so that the second solenoid when energized will move its movable armature and the shaft a predetermined distance, a locking means having an armature located to be actuated by energizing a third one of said solenoids for holding said shaft at the position to which it is moved by said second solenoid so that said coupling means may be disengaged from said shaft and returned to its original position, whereupon the shaft may be again moved in the same direction an additional predetermined amount in a step-by-step fashion, means for inserting a resistance in series with said third solenoid when said third solenoid is energized to engage said holding means and said rectilinear motor is stopped, means including a motor for opening and closing switches connected in series with said solenoids in a predetermined sequence comprising a cycle of operations for moving said shaft member one step, a manual switch for starting and stopping said motor and an additional switch also operated by said motor during each cycle of operation for short circuiting said manual switch throughout each of said cycles until said coupling means is disengaged and returned to its original position.

18. A rectilinear motor comprising, a plurality of longitudinally spaced aligned solenoids mounted on a tubular member, a shaft member projecting through said tubular member, coupling means rigidly connected to the movable armature of one of said solenoids, a second armature having means to cause said coupling means to engage said shaft in response to movement of the second armature upon energization of a second one of said solenoids so the first solenoid when energized will move its movable armature and the shaft a predetermined distance, locking means rigidly attached to said tubular member and actuated by the movable armature of a third one of said solenoids for holding said shaft in the position to which it is moved by the movable armature of said one solenoid so that said coupling means may be disengaged from said shaft and returned to its original position, whereupon the shaft may be again moved in the same direction an additional predetermined amount in a step-by-step fashion.

19. A rectilinear motor comprising, a solenoid, a shaft member projecting through said solenoid, a coupling means normally biased to an uncoupled position and having electro-responsive means for causing it to couple said shaft to the movable armature of said solenoid so that said solenoid when energized will move said movable armature and shaft a predetermined distance, and a releasable locking means normally biased to an unlocked position and having electro-responsive means for causing it to lock said shaft at the position to which it is moved by said solenoid so that said coupling means may be disengaged from said shaft and returned to its original position, whereupon the shaft may be again moved in the same direction an additional predetermined amount in a step-by-step fashion.

20. A rectilinear motor comprising, a solenoid mounted on the outer surface of a tubular member, said tubular member being closed at one end and adapted to be in fluid communication with an external source of fluid at the opposite end, a shaft member projecting into said tubular member, a coupling means for coupling said shaft to the movable armature of said solenoid so that said solenoid when energized will move said movable armature and shaft a predetermined distance, a releasable locking means for holding said shaft at the position to which it is moved by said solenoid so that said coupling means may be disengaged from said shaft and returned to its orginal position, whereupon the shaft may be again moved in the same direction an additional predetermined amount, and a thermal barrier for said tubular member between said solenoid and said opposite end of the tubular member comprising, cooling means on said tubular member and means in said tubular member forming a chamber located to be cooled by said cooling means and having restricted ingress and egress for the passage of fluid.

No references cited.